United States Patent [19]

Barron

[11] 4,249,716
[45] Feb. 10, 1981

[54] VALVE CLAMP ASSEMBLY

[76] Inventor: John Q. Barron, 5111 W. Van Buren St., Chicago, Ill. 60644

[21] Appl. No.: 52,836

[22] Filed: Jun. 28, 1979

[51] Int. Cl.³ .............................................. F16K 51/00
[52] U.S. Cl. ................................. 251/146; 24/135 L; 24/243 E; 248/231; 285/188
[58] Field of Search ..................................... 236/61–66; 248/231; 251/145, 146; 24/135 R, 135 A, 135 C, 135 N, 136 B, 243 N, 263 A; 285/188

[56] References Cited

U.S. PATENT DOCUMENTS

| 1,296,883 | 3/1919 | VanCott | 24/135 A X |
| 1,601,365 | 9/1926 | Keator | 24/135 L X |
| 1,801,740 | 4/1931 | Halsey | 236/66X |
| 2,567,659 | 9/1951 | Valenta | 285/188 X |
| 2,576,055 | 11/1951 | Walsh | 24/243 E X |
| 3,046,040 | 7/1962 | Luper | 285/188 X |
| 3,866,879 | 2/1975 | Elizondo et al. | 251/145 |
| 4,094,487 | 6/1978 | Heard | 248/231 |

FOREIGN PATENT DOCUMENTS 413588  7/1934  United Kingdom ...................... 248/231

Primary Examiner—William E. Tapolcai, Jr.
Attorney, Agent, or Firm—Neuman, Williams, Anderson & Olson

[57] ABSTRACT

An inexpensive valve clamp assembly is provided which inhibits removal of a radiator relief valve. The assembly includes a cable for securing the valve to the radiator, a plate which holds the cable in position relative to the valve, and a clamp to maintain the cable in position relative to the radiator.

6 Claims, 3 Drawing Figures

VALVE CLAMP ASSEMBLY

BACKGROUND OF THE INVENTION

1. Field of the Invention

This invention relates to improvements in heating systems. More specifically, it relates to inexpensive devices that prevent misuse of radiators.

While the present invention is described herein with reference to particular embodiments, it should be understood that the invention is not limited thereto. The assembly of the present invention may be adapted and employed for a variety of requirements as those skilled in the art will recognize in light of the present disclosure.

2. Description of the Prior Art

Of the many heating systems currently available, steam heating systems are among those most widely used. It is commonly known that steam heating systems include a boiler and one or more radiators which are connected to the boiler by suitable pipes. The boiler, typically located in a basement, may be activated to heat water to a boil and thereby generate steam. The steam travels through the pipes to the radiators where it is contained as it radiates heat. When the heat is shut off, the steam in the radiator condenses into water and returns to the boiler via the pipes. The vapor space previously occupied by the steam is filled with the cooler ambient air drawn from the room being heated. This air must be released from the radiator back into the room during the next heating cycle as the vapor space is again occupied by the high temperature steam from the boiler. For this reason, most radiators are provided with a heat-sensitive relief valve which allows the cooler air to enter or escape from the radiator while preventing the escape of steam.

Many landlords have discovered that during the severe cold of winter some tenants will remove the relief valve so that steam escapes the radiator and warms the room. The removal of the relief valve is readily accomplished because typically it is simply threaded into a threaded aperture in the radiator body. Unfortunately, the removal of the relief valve from one radiator causes a depletion of vapor pressure in other radiators and a resultant drop in the operating temperature of the entire system. This gives rise to complaints to the landlord and government officials and attempts by the other tenants to remove valves on their radiators as well.

Moreover, as the temperature of the system drops, the boiler is activated and remains on to compensate for the temperature loss. This not only wastes energy, but also increases heating costs. More importantly, the boiler will be overworked and invariably break down. A boiler breakdown during the winter is not only costly, but also gives rise to more tenant complaints and government action.

Removal of the valve creates some additional problems. One is the hazard posed by the release of steam. Case histories of tenants being severely burned by the sudden escape of steam have been documented by the news media. Steam can also damage the walls, ceilings, and furnishings of the premises leaving the premises in an unattractive condition and adding further to maintenance costs.

OBJECTS OF THE INVENTION

It is, therefore, a general object of this invention to overcome the aforementioned problems associated with removable radiator relief valves.

It is another general object of this invention to provide an assembly which effectively inhibits removal of the relief valve from the radiator by the tenant and yet can readily be removed by maintenance personnel.

It is a more specific object of this invention to provide an inexpensive radiator relief valve clamp assembly which secures the relief valve to the radiator and is safe to use.

These and other objects will become apparent upon consideration of the description which follows:

SUMMARY OF THE INVENTION

The objects of this invention are achieved by an assembly which restrains a radiator relief valve or vent from rotational or translational motion relative to a radiator.

The assembly includes a cable for securing the valve to the radiator, a plate for holding the cable in position relative to the valve and the radiator, and a clamp to maintain the cable in position relative to the radiator.

BRIEF DESCRIPTION OF THE DRAWINGS

The present invention will be more clearly understood from the following detailed description read in conjunction with the accompanying drawings, in which.

DETAILED DESCRIPTION OF THE PREFERRED EMBODIMENT

Figure 1:
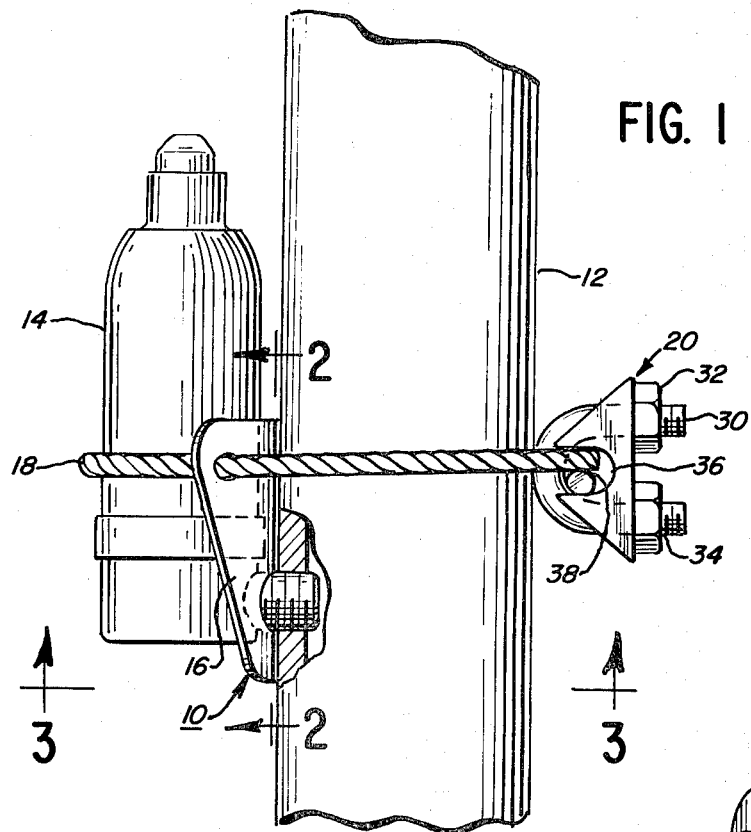
FIG. 1 depicts a side elevational view of the preferred embodiment of the invention fully assembled and in an operative position on a radiator-valve assembly.

An embodiment utilizing the principles of this invention is shown in FIG. 1. The valve clamp assembly 10 is shown in position on a radiator 12 having a steam release valve 14 secured thereto by a conduit 28. The assembly 10 includes a curved plate 16 apertured to receive a cable 18 which is secured to the radiator 12 by a cable clamp 20.

Figure 3:
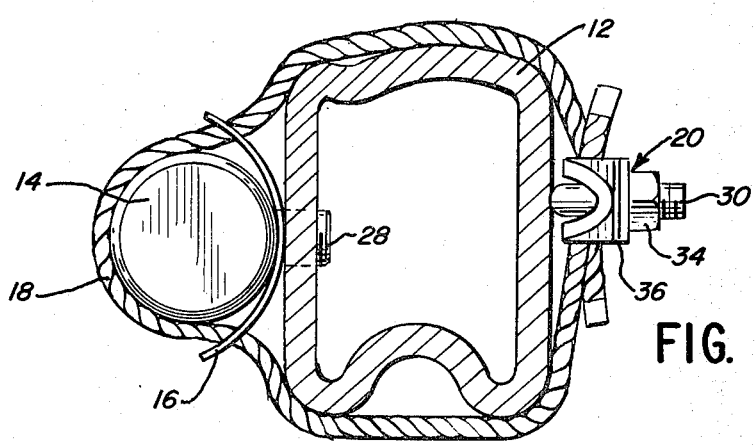
FIG. 3 depicts a bottom view of the preferred embodiment of the invention fully assembled and in an operative position on a radiator-valve assembly.

The plate is constructed of metal or other suitable material. The plate 16 has a generally triangular shape which minimizes sharp corners, provides an economical design and enhances the appearance of the assembly 10. The plate 16 has apertures 22 and 24 to receive the cable 18. As shown in the bottom view of FIG. 3, the plate 16 is curved to permit the cable 18 to slide through apertures 22 and 24 when the assembly is in position on the radiator 12. This allows the clamp 20 to be firmly secured to the cable 18 and moved around the radiator 12 to be obscured from view. A third aperture 26 is provided in plate 16 to receive the conduit 28 which extends from the valve 14 to engage the radiator 12. The plate 16 may be integrated into the housing of the radiator 12 of the valve 14 without departing from the true spirit and scope of applicant's invention.

The cable 18 extends around the valve 14 through apertures 22 and 24 in plate 16 around the radiator pipe 12 and through the clamp 20. In the preferred embodiment, the cable 18 is constructed of a plurality of twisted strands of wire. Other connectors may be used to secure the valve 14 to the radiator 12 without departing from the scope of this invention.

The clamp 20 is a commercially available item. It includes a U-shaped bolt 30 which is threaded at both ends to receive nuts 32 and 34. A generally triangular fastener 36 having an apex 38, open and slotted to receive the cable 18, is secured to the bolt 30 by the nuts 32 and 34.

Figure 2:
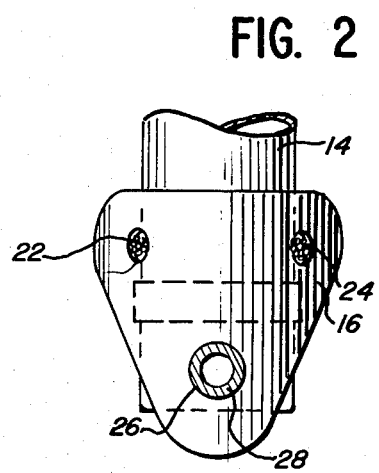
FIG. 2 depicts a front view of a portion of the preferred embodiment of the invention.

To install the assembly 10, the valve 14 is unscrewed or otherwise removed from the radiator 12. The plate 16 is then placed on the valve 14 so that the conduit 28 extends through the aperture 26 as shown in FIG. 2. Next, the valve 14 is replaced on the radiator 12. The cable 18 is then threaded through an aperture 22 or 24 around the valve 14 through the other aperture 22 or 24 and around the radiator 12. Next, the clamp 20 as assembled so that the fastener 36 is loosely secured to the bolt 30 by nuts 32 and 34. The ends of the cable 18 are then passed through the clamp 20 at the apex 38 of the fastener 36. Next, the clamp is secured on the cable 18 by tightening the nuts 32 and 34. The ends of the bolt 30 may then be bent or crimped to retain the nuts 32 and 34 and the clamp 20 in the tightened position. The cable 18 and the clamp 20 may then be shifted around the radiator so that the clamp 20 is obscured from view.

With the assembly 10 in position as shown in FIG. 1, removal of the valve 14 by rotational or translational motion is inhibited.

To remove the assembly 10, the ends of bolt 30 may be straightened by maintenance personnel equipped with commercially available tools (i.e., pliers). If necessary, bolt or cable cutters may be used to cut the cable and expedite removal of the assembly without damaging the radiator or the relief valve.

While a preferred embodiment of this invention has been shown and described, it will be understood that the invention is not limited thereto. In view of the foregoing teachings, modifications may be made within the scope of this invention by one of ordinary skill in the art to which this invention pertains. For example, as discussed above, the plate 16 could be constructed of any suitable material and it could be integrated with the housing of the valve 14 without departing from the true spirit of applicant's invention. The clamp 20 may be likewise replaced by a commonly available cable clamp without departing from the teachings of this invention. Thus, it is contemplated by the appended claims to cover any modification and any other embodiment which constitutes the salient features of this invention.

What is claimed is:

1. Apparatus for retaining a valve on a radiator, said apparatus comprising: an elongate stranded cable for securing said valve to said radiator; a plate having apertures through which said cable extends and means for attaching said plate to said valve for holding said cable in position relative to said valve; and a clamp for maintaining said cable on said radiator including a U-shaped bolt threaded at each end, a fastener adapted for reciprocal movement on said bolt so as to define an opening between the apex of said fastener and the vertex of said bolt through which the ends of said cable extends and means adapted for threaded engagement of the ends of said bolt for adjusting the position of said fastener relative to said bolt so as to vary the distance between the apices thereof and thereby restrain said cable therebetween; whereby rotational and translational motion of said valve is inhibited by said apparatus.

2. The apparatus of claim 1 wherein said plate is curved.

3. The apparatus of claim 2 wherein said plate is triangular.

4. A device for use with a relief valve on a radiator wherein said relief valve includes a generally cylindrical housing having an externally threaded conduit projecting transversely therefrom and wherein said radiator includes a hollow portion having a wall into which said conduit is threaded for installation of said valve thereon, said device comprising: a flexible cable arranged to be extended tightly in encircling relation around said generally cylindrical housing of said valve and said radiator portion, holding means for securing end portions of said cable together, and a guide member adapted to be positioned between said housing of said valve and said hollow radiator portion, said guide member having an opening through which said hollow conduit portion extends, and said guide member further including locating means for engagement with portions of said cable on opposite sides of said housing of said valve for positioning said cable in a plane transverse to the axis of said cylindrical housing of said valve and spaced a substantial distance from the axis of said conduit member, whereby said cable is positioned to limit rotational movement of said valve about the axis of said conduit member.

5. In a device as defined in claim 4, said guide member having a pair of apertures therethrough to define said locating means.

6. In a device as defined in claim 4, said guide member being in the form of a generally triangular plate having rounded corner portions.

* * * * *